United States Patent [19]

Courtney

[11] Patent Number: 5,390,409
[45] Date of Patent: Feb. 21, 1995

[54] METHODS OF MANUFACTURING OF GENERATOR STATOR FRAMES

[75] Inventor: John P. Courtney, Lynnfield, Mass.

[73] Assignee: General Electric Co., Schenectady, N.Y.

[21] Appl. No.: 112,312

[22] Filed: Aug. 27, 1993

[51] Int. Cl.⁶ ............................................. H02K 15/14
[52] U.S. Cl. .......................................... 29/596; 29/558; 310/42; 310/258
[58] Field of Search .................... 29/596, 598, 558; 310/42, 91, 217, 258

[56] References Cited

U.S. PATENT DOCUMENTS 1,784,643  12/1930  Reist ......................................... 29/596

Primary Examiner—Carl E. Hall
Attorney, Agent, or Firm—Nixon & Vanderhye

[57] ABSTRACT

Dovetail connections on the interior faces of key bars are formed subsequent to the fabrication of the key bars in a generator stator frame assembly. A cutting tool is mounted on column for indexing a full 360°. The tool is also mounted for vertical, radially inward and outward, and tangential movements. The stator frame is mounted about the column and extends vertically. The tool removes material from the interior faces of the key bars and along each side of the key bar to establish the width and depth of the tenon being formed. An angle cutter tool then provides angled cuts to provide the tapered surfaces on opposite sides of the key bar to form the flaring tenon of the dovetail connection. By forming the tenons subsequent to fabrication of the frame, high tolerances are maintained with respect to fitting mortises on the laminations.

9 Claims, 4 Drawing Sheets

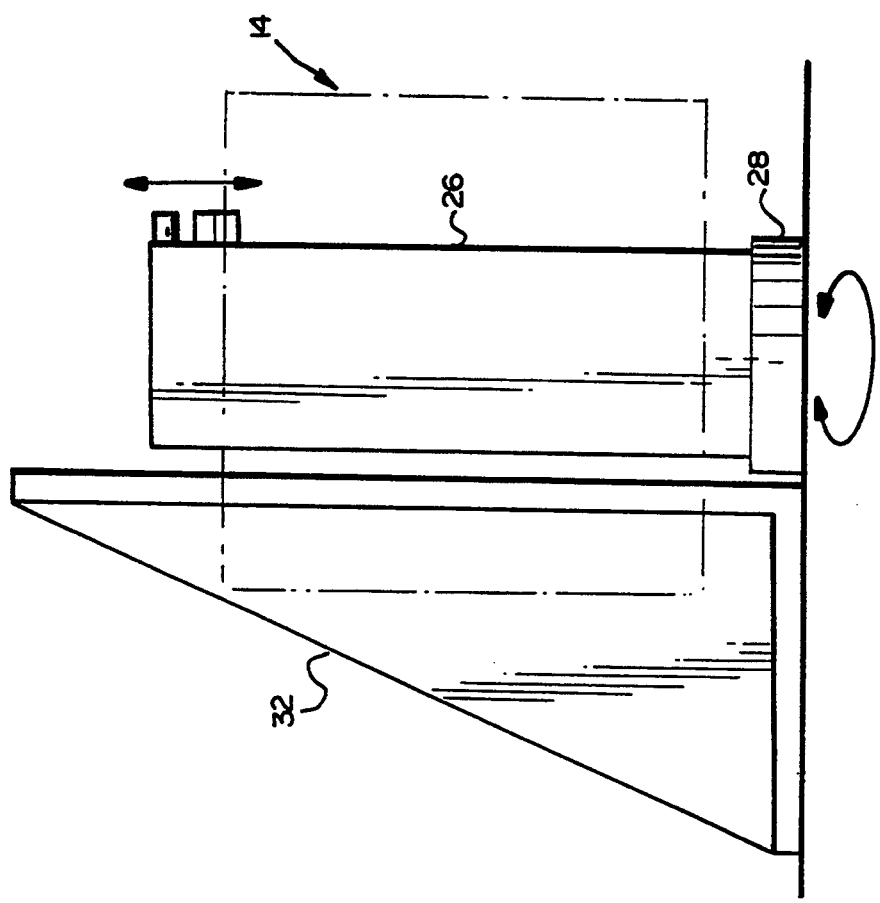
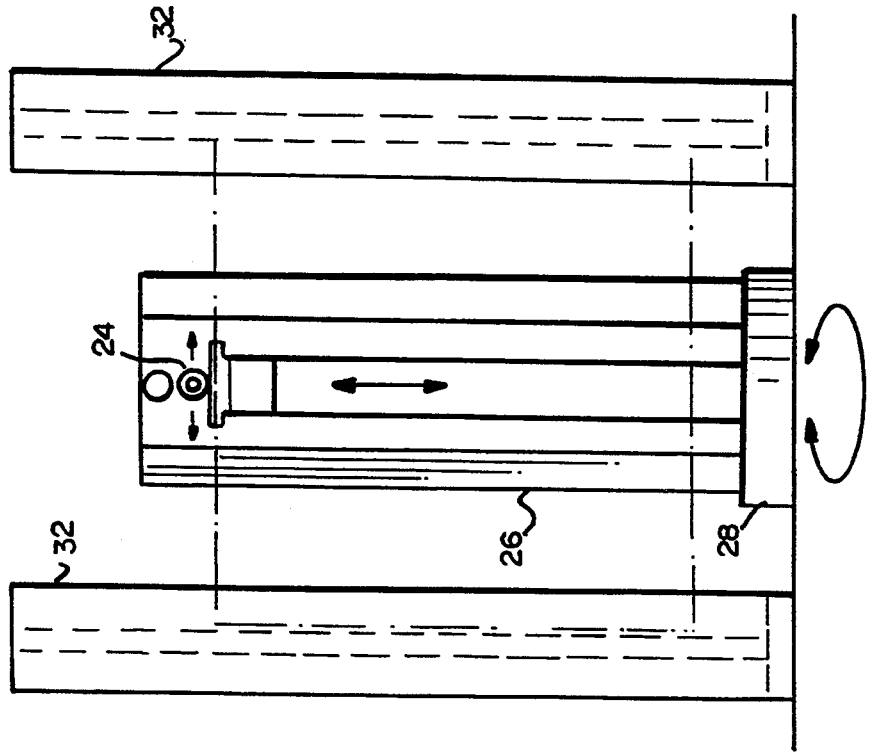

FIG. 6A
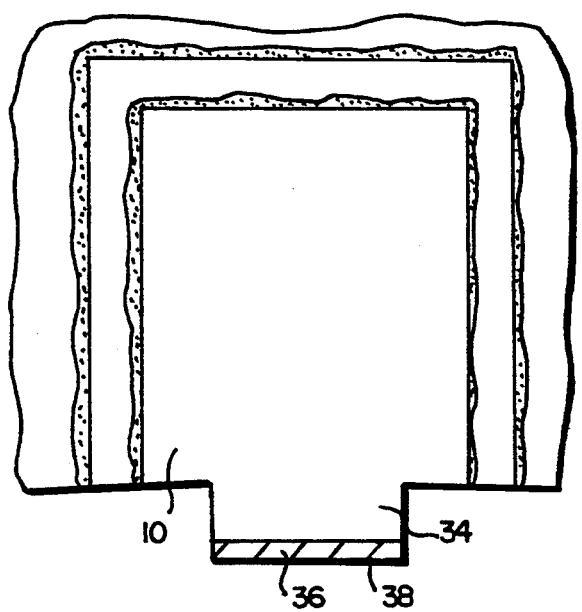
FIG. 6B
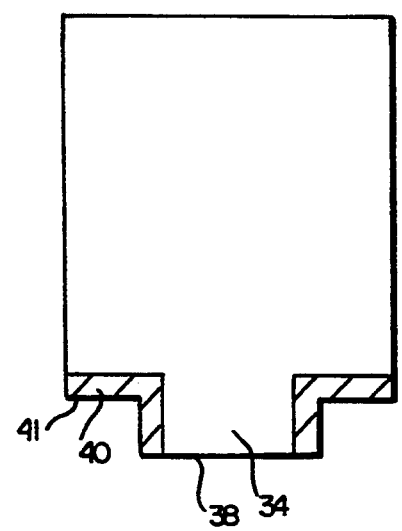
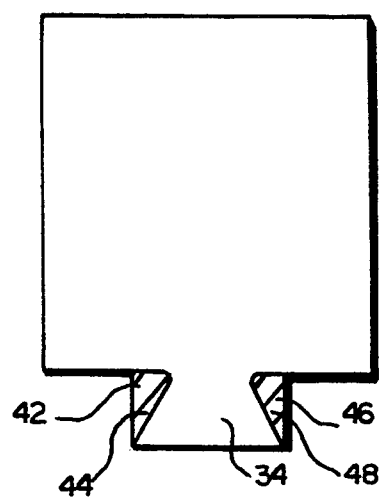
FIG. 6C
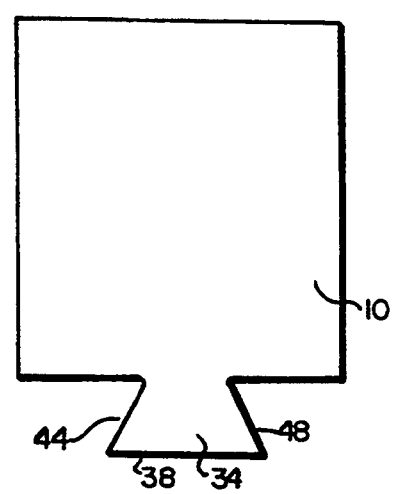
FIG. 6D

METHODS OF MANUFACTURING OF GENERATOR STATOR FRAMES

TECHNICAL FIELD

The present invention relates to the manufacture of generator stator frames and particularly relates to a method for fabricating dovetail connections on the stator frame key bars for joining the key bars and stator laminations to one another.

BACKGROUND

In the manufacture of a stator frame for a generator, the most difficult and costly element of the manufacturing operation is locating and welding the key bars within the appropriate tolerances. Key bars for the stator frame are typically provided with dovetail connections, i.e., the flared tenon portion of the dovetail connection, prior to assembly and welding of the key bars in the stator frame. The key bar dovetail connections mate with complementary dovetail connections, i.e., the fitting mortises of the dovetail connections, on laminations disposed within the stator frame. Conventionally, the laminations are struck in a die and the position of the dovetail connections are highly accurately located. The accuracy of the dovetail connections on the key bars must likewise be as accurate as those on the laminations. Most fabricators cannot maintain the tolerances required for the location of the key bars in a generator stator frame, for example, such tolerances may be ±0.015 inches in both the radial and chordal directions. To accurately align the key bars both radially and chordally within these tolerances is virtually impossible when welding the key bars in the frame. These necessary close tolerances have been previously obtained by hand-working the dovetails in the frame subsequent to fabrication of the frame to accept the generator laminations. This is a very time-consuming, labor-intensive and expensive practice.

DISCLOSURE OF THE INVENTION

According to the present invention, the dovetail connections are formed on the key bars after the key bars are located and assembled in the stator frame. This enables accurate formation of the key bar dovetail connections within the required tolerances for fit with the dovetail connections of the laminations. Generally, to accomplish the foregoing, the key bars, without dovetail connections, are welded in the stator frame. The stator frame is then disposed in a jig and a cutting tool mills the dovetail key bars along their inside faces to form the connections within the required tolerances. Particularly, the stator frame is disposed vertically on a fixed surface and a cutting tool is located within the frame for vertical movement parallel to the key bars, indexing movement throughout a full 360°, and movement in radial and chordal directions such that dovetail connections, i.e., the flaring tenons, can be formed on the key bars subsequent to their fabrication in the stator frame for accurate highly toleranced fit with complementary fitting mortises on the laminations.

In a preferred embodiment according to the present invention, there is provided a method of fabricating dovetail connections for key bars of a generator stator frame for accurate fit with complementary dovetail connections of generator laminations comprising the steps of (a) securing a plurality of key bars without dovetail connections in a stator frame at circumferentially spaced locations about the frame and (b) subsequent to step (a), forming the dovetail connections along the key bars from within the frame to accurately fit with complementary dovetail connections on the generator laminations.

Accordingly, it is a primary object of the present invention to provide a novel and improved method of fabricating a generator stator frame which eliminates the need for highly accurate closely toleranced location of the key bars during fabrication of the stator frame and provides for the formation of dovetail connections on the key bars within the required close tolerances subsequent to fabrication of the frame.

BRIEF DESCRIPTION OF THE DRAWINGS

FIGS. 4 and 5 are schematic front and side elevational views of a cutting tool and frame assembly for holding the stator frame while the dovetail connections are formed; and FIGS. 6a–6d are fragmentary schematic end views of a key bar illustrating the milling process by which the flaring tenon of the key bar is formed.

BEST MODE FOR CARRYING OUT THE INVENTION

Figure 1:
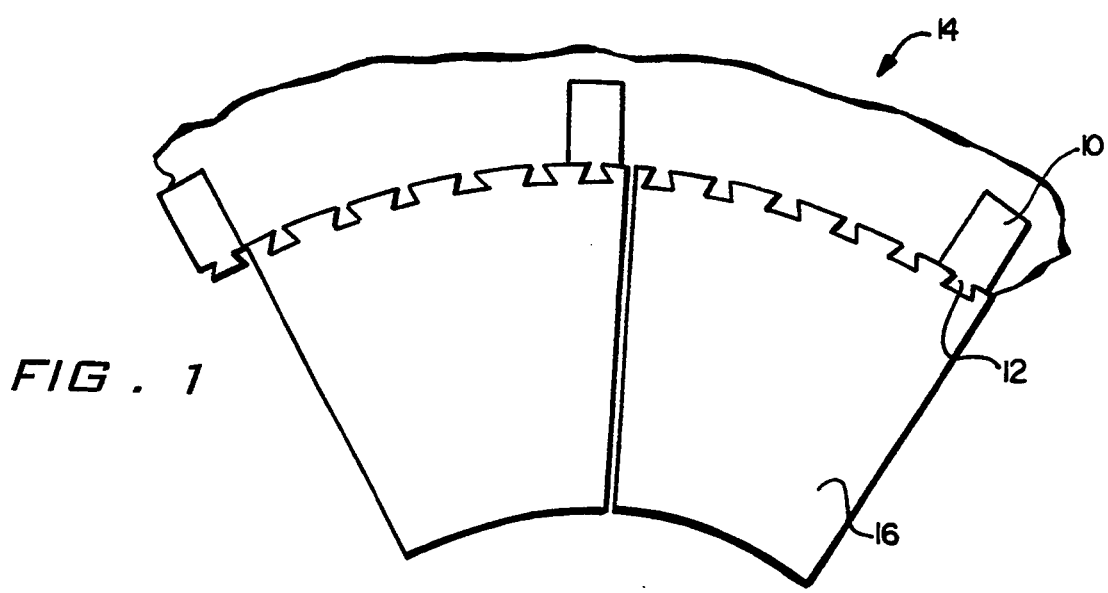
FIG. 1 is a fragmentary end view illustrating a pair of laminations coupled to key bars in a generator stator frame.
Figure 3:
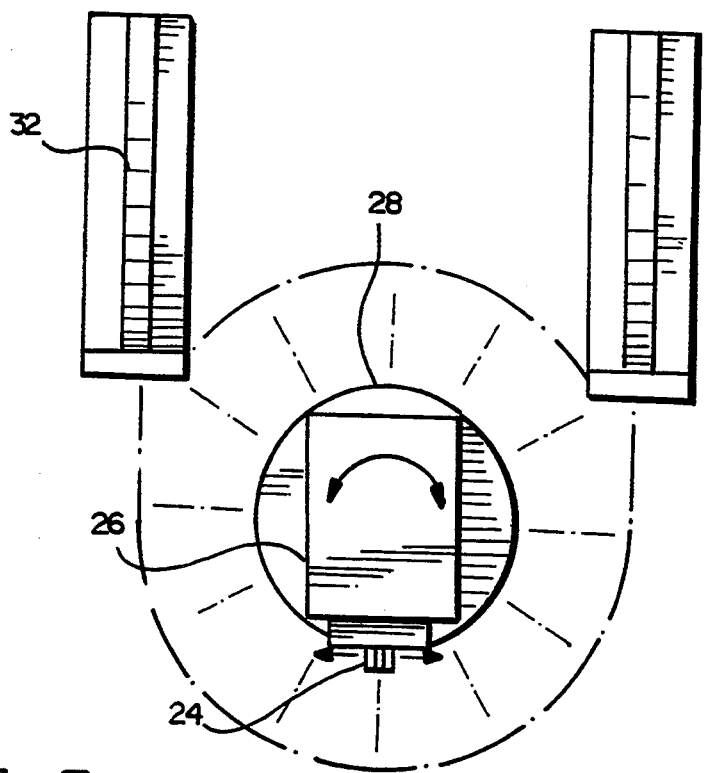
FIG. 3 is a schematic top plan view thereof.

Referring now to FIG. 1, there is schematically illustrated a portion of an assembled stator frame for a generator. Particularly, there is illustrated a plurality of key bars 10 having dovetail connections 12 along their radial inner faces spaced circumferentially one from the other in the stator frame, generally designated 14, which also, in final assembly, includes a plurality of stacked laminations 16 having mating dovetail connections formed along radially outermost peripheral surfaces thereof for joining with the dovetail connections of the key bars. As well known, it is essential to provide the dovetail connections between the key bars and the laminations within high tolerances in both radial and chordal directions, for example, on the order of ±0.015 inches.

Figure 2:
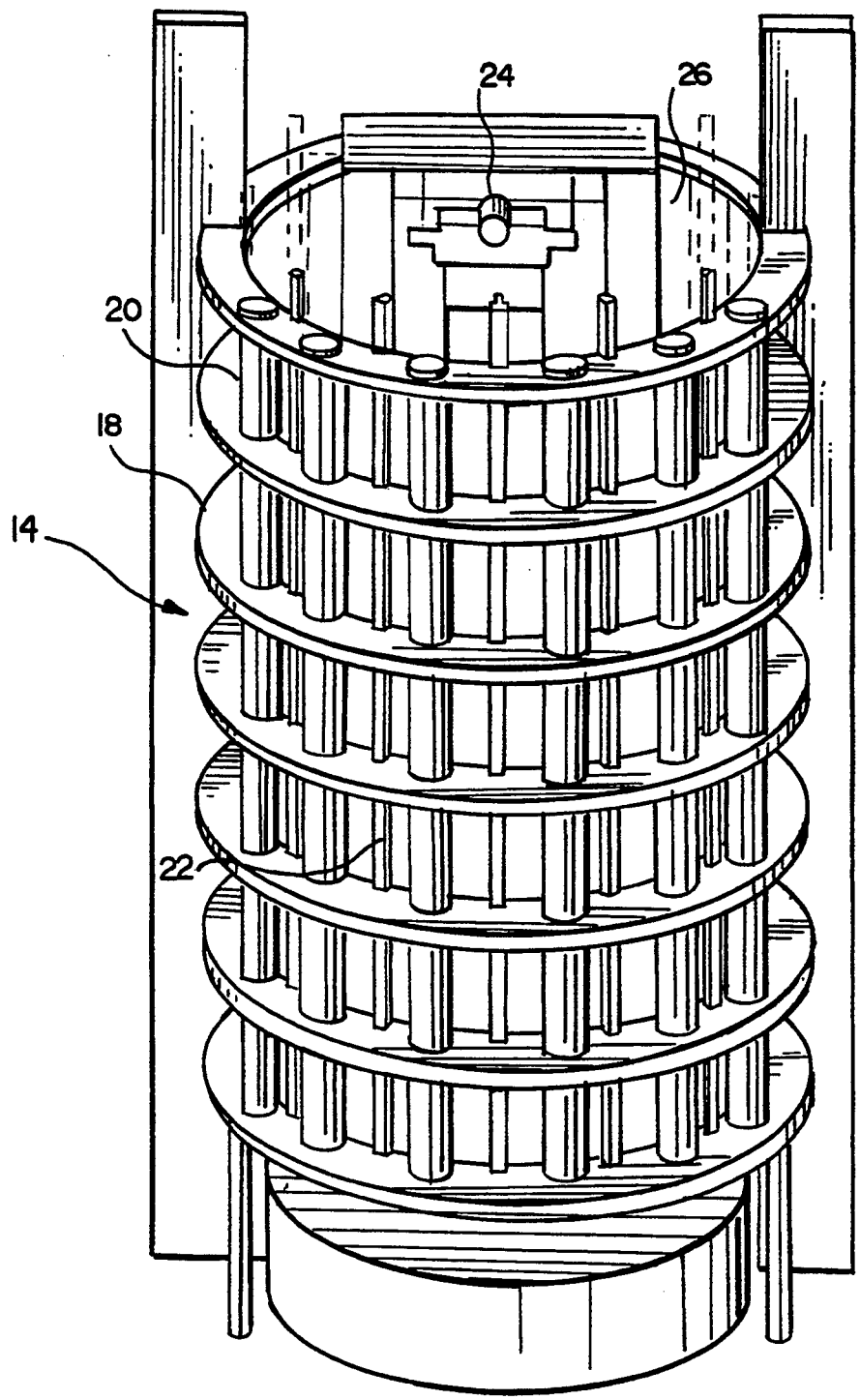
FIG. 2 is a perspective view of an entire stator frame mounted on a jig assembly and in position for forming dovetail connections on the key bars in accordance with the present invention.

In accordance with the present invention, the stator frame is initially fabricated, as illustrated in FIG. 2, with a plurality of axially spaced web plates 18, interconnecting trunion bars 20 and a plurality of key bars 10 about the inner periphery of the web plates. It will be appreciated that the key bars are circumferentially spaced about the inner periphery of the web plates 18 and are positioned generally within easily obtainable tolerances with respect to their location in the stator frame whereby the generator frame can be initially readily and easily manufactured at minimum expense.

Once the frame has been fabricated, the dovetail connections, i.e., the flaring tenons on the key bars 10, are formed from within the stator frame. To accomplish this, there is provided a cutting tool 24 carried on an upstanding guide frame 26 mounted on a rotary turntable 28. Thus, the turntable 28 may index tool 26 throughout the full 360° of rotation to locate the tool circumferentially relative to the key bars 10. The cutting tool 24 is guided for vertical movement along frame 26 by guides or ways, not shown. Additionally, the tool 24 is mounted for radial inward and outward movement, as well as chordal or tangential movement in opposite directions, as indicated by the arrows. By moving tool 24 vertically along the ways, as well as in radially inward and outward directions and chordally, i.e., tangentially, the tool can be positioned to mill a dovetail connection, i.e., the flaring tenon, on each of the key bars.

More particularly, to fabricate the stator frame according to the present invention, the stator frame is lifted, for example, by a crane, not shown, to engage a pair of vertically upstanding supports 32 and to which support 32 the frame 14 is secured. The tool 24 is then positioned adjacent the uppermost end of the tool frame 26 and indexed into alignment with one of the key bars 10. By accurately centering the stator frame and the machine tool, the cutting tool 26 can be advanced to mill material from the inner face of each key bar. While a projecting portion 34 on key bar 10 of a generally rectangular cross-section is illustrated, it will be appreciated that the key bars may have other cross-sectional shapes such as round, and need not have an initially projecting face portion 34.

With reference to FIG. 6a, the tool is initially positioned to mill the front face 36 of the projecting portion 34 in a single pass or multiple passes vertically downwardly along the key bar. Accurate positioning of the front face 38 of the key bar relative to the axis of the stator frame is thus achieved. Once the first key bar has its front face milled to the appropriate tolerance, and which face 38 will form the inner face of the flaring tenon, tool 24 is indexed by rotating the turntable 28 to register opposite the interior face of the next key bar. For example, if there are twelve key bars circumferentially spaced one from the other, the tool would be indexed 30° after milling each face 38. The face portion 34 of each key bar is then machined in succession about the interior of the stator frame to form face 38 within the required tolerances. After all of the key bars have been milled and an appropriate tool change has been made, the spindle is located along one side of the projecting portion 34 of the first key bar to remove material 40 along the side of the projecting portion 34 and the recessed face portion 41 of the key bar 10, as illustrated in FIG. 6b. With a single pass, the tool machines the key bar to the appropriate depth and width of the flaring tenon along one side of the key bar. The tool is then stepped to the opposite side of the projecting portion 34 of the key bar 10 and performs a similar milling operation along the opposite side of the key bar. Consequently, the inner face of the key bar is accurately cut to the appropriate depth and width of the projecting portion 34, which will ultimately form the flaring tenon of the dovetail connection. The tool 26 is then indexed to perform the width and depth cuts on an adjacent key bar similarly as just described. That operation is repeated for each of the key bars.

Once each flaring tenon has been cut to its appropriate width and depth, as illustrated in FIG. 6b, the tool is changed to provide an angle cutter for forming the tapered sides of the flaring tenon. The tool spindle is once again located at the top of the column and one side of the projection 34 is cut at an angle to remove material 42 to form the tapered surface 44. The tool is then withdrawn, retracted once again to the top of the column, indexed for cutting the taper along the opposite side of the projecting portion 34 and displaced from top to bottom to remove material 46 to form the angled side surface 48 along the opposite side of the projecting portion 34. Consequently, it will be appreciated that a flaring tenon has been accurately formed within precise tolerances along the inside face of each of the key bars 10.

The stator frame may then be removed from the side frames 32 with all flaring tenons of the dovetail connections on the key bars accurately located relative to one another within the required tolerances for mating with complementary fitting mortises on the laminations to be stacked axially within the frame. It will be appreciated that all cuts by the tool 26 are made from the top of the column toward the bottom, with a rapid traverse of the tool back to the top of the column.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A method of fabricating dovetail connections for key bars of a generator stator frame for accurate fit with complementary dovetail connections of generator laminations comprising the steps of:
   (a) securing a plurality of key bars without dovetail connections in a stator frame at circumferentially spaced locations about the frame; and
   (b) subsequent to step (a), forming the dovetail connections along the key bars from within the frame to accurately fit with complementary dovetail connections on the generator laminations.

2. A method according to claim 1 including the step of fixing the stator frame from movement and forming the dovetail connections along inner surfaces of the key bars of the fixed stator frame.

3. A method according to claim 2 wherein the stator frame has an elongated axis and the key bars extend along the frame parallel to the elongated axis, including the steps of fixing the stator frame from movement with the axis thereof extending in a generally vertical direction, and passing a cutting head of a machine tool vertically along each of the interior surfaces of the key bars to form the dovetail connections.

4. A method according to claim 3 including passing the cutting tool along the key bars first to form radially inwardly directed faces of flaring tenons on the key bars at positions matched and complementary to faces of fitting mortises of the laminations followed by passing the cutting tool along opposite sides on each key bar to form sides of the flaring tenons.

5. A method according to claim 4 wherein the step of passing the tool along the sides of the key bars includes first passing the cutting tool along opposite sides of each tenon to form generally right angularly related side surfaces on opposite sides of said tenon defining the width and depth of the tenon, followed by passing the cutting tool along the side surfaces to form tapered surfaces along opposite sides of the flared tenons.

6. A method according to claim 5 wherein each pass of the cutting tool is performed vertically parallel to the axis of the frame.

7. A method according to claim 2 wherein the dovetail connections along inner surfaces of the key bars are formed in succession about said stator frame.

8. A method according to claim 7 wherein, after the inner surfaces are formed, passing the cutting tool along opposite sides of each key bar in succession to form opposite sides of the flaring tenons.

9. A method according to claim 8 wherein, after the opposite sides of the key bars are formed, passing the cutting tool along the side surfaces to form tapered surfaces along opposite sides of each of the flared tenons in succession.

* * * * *